United States Patent
Sigrist (10) Patent No.: US 10,494,184 B2
(45) Date of Patent: Dec. 3, 2019

(54) APPLIANCE FOR CHARGING TRANSPORT POCKETS

(71) Applicant: Ferag AG, Hinwil (CH)

(72) Inventor: Sergio Sigrist, Hinwil (CH)

(73) Assignee: FERAG AG, Hinwil (CH)

( * ) Notice: Subject to any disclaimer, the term of this patent is extended or adjusted under 35 U.S.C. 154(b) by 0 days.

(21) Appl. No.: 15/778,309

(22) PCT Filed: Nov. 23, 2016

(86) PCT No.: PCT/CH2016/000147
§ 371 (c)(1),
(2) Date: May 23, 2018

(87) PCT Pub. No.: WO2017/088077
PCT Pub. Date: Jun. 1, 2017

(65) Prior Publication Data
US 2018/0339859 A1  Nov. 29, 2018

(30) Foreign Application Priority Data

Nov. 25, 2015 (CH) ......................................... 1721/15

(51) Int. Cl.
*B65G 17/12* (2006.01)
*B65G 19/02* (2006.01)
(Continued)

(52) U.S. Cl.
CPC .......... *B65G 17/126* (2013.01); *B65G 17/36* (2013.01); *B65G 19/025* (2013.01); *B65G 47/61* (2013.01)

(58) Field of Classification Search
CPC .................................................. B65G 17/20
See application file for complete search history.

(56) References Cited

U.S. PATENT DOCUMENTS 748,576 A * 1/1904 Bivert ........................... 198/529
2014/0284179 A1* 9/2014 Janzen .................... B65G 17/20
198/703

FOREIGN PATENT DOCUMENTS

DE  397192  6/1924
DE  692888  6/1940
(Continued)

OTHER PUBLICATIONS

English translation of International Preliminary Report on Patentability dated May 29, 2018 (May 29, 2018), Application No. PCT/CH2016/000147, 6 pages.
(Continued)

*Primary Examiner* — Gene O Crawford
*Assistant Examiner* — Lester Ill Rushin
(74) *Attorney, Agent, or Firm* — Rankin, Hill & Clark LLP (57) ABSTRACT

An appliance for charging transport pockets with a transport item includes a feed device that feeds the transport item into a transfer zone and a suspended conveying device with a plurality of transport pockets that are arranged one after the other for taking over the transport item in the transfer zone and conveying away the charged transport pockets. The transport pockets each form a receiving compartment for the transport item, and are connected to a conveying member of the suspended conveying device. The transport pockets are moved through the transfer zone in a lying formation in a transfer conveying direction, and the transport item, by way of the feed device, is conveyed into the transfer zone essentially in the transfer conveying direction of the transport pockets, and in a delivery region is delivered from above onto the transport pockets which are moved through the transfer zone below the feed device.

16 Claims, 9 Drawing Sheets

(51) Int. Cl.
*B65G 47/61* (2006.01)
*B65G 17/36* (2006.01)

(56) References Cited

FOREIGN PATENT DOCUMENTS

| | | | | |
|---|---|---|---|---|
| DE | 103 54 419 | 6/2005 | | |
| DE | 10 2004 018 569 | 11/2005 | | |
| DE | 10 2008 061685 | 6/2010 | | |
| DE | 10 2012 018 925 | 3/2014 | | |
| DE | 102012018925 A1 * | 3/2014 | ............ | B65G 47/38 |
| DE | 10 2013 205 170 | 9/2014 | | |
| EP | 0 638 501 | 2/1995 | | |
| EP | 1 420 105 | 5/2004 | | |
| EP | 2 418 160 | 2/2012 | | |
| WO | 90/03853 | 4/1990 | | |

OTHER PUBLICATIONS

Switzerland Search Report dated Dec. 2, 2016, Application No. 01721/15, 2 pages.

* cited by examiner

APPLIANCE FOR CHARGING TRANSPORT POCKETS

BACKGROUND OF THE INVENTION

Field of the Invention

The invention concerns the field of transport technology and conveying technology, in particular intra-logistics and relates to an appliance for charging (loading) transport pockets with transport items. The appliance includes a feed device for feeding the transport item into a transfer zone, as well as a suspended conveying device with a plurality of transport pockets that are arranged one after the other in the conveying direction for taking over the transport item in the transfer zone and for conveying away the charged transport pockets. The transport pockets each form a receiving compartment for the transport item, as well as a pocket rear wall and are fastened to a conveying member of the suspended conveying device.

The invention moreover also relates to a method for charging transport pockets with transport item by way of the appliance according to the invention, wherein the transport item is fed to the transfer zone by way of the feed device and is transferred into the receiving compartments of the transport pockets, the pockets being fed to the transfer zone by the suspended conveying device.

Description of Related Art

In automated warehouses, vast production facilities and very generally concerning the transport of goods, there exists the need to receive the items (goods) in suitable receptacles, to then convey these receptacles further, for example via a suspended conveying device, and to intermediately store them or to transport them to their designated location and to unload them again there.

Hence, it is known from the state of the art to apply suspended conveying devices with transport pockets for the transport of the goods.

The published document DE 10 2004 018 569 A1, for example, describes a suspended conveyor with a plurality of collecting pockets which can be folded together and which are for receiving and the sorting of objects, in particular pieces of clothing. The collecting pocket includes a frame mount and a pocket pouch which is suspended on the frame mount. The collecting pocket is suspended on the suspended conveyor via a hook, which is attached to the frame mount.

The advantage of transport pockets lies in the fact that they are designed in a flexible manner. The receiving compartment, i.e. the pocket pouch, can be compressed or pressed together by way of this, e.g., by way of folding together. In this manner, the transport pockets permit goods logistics, which are space-saving, compared, for example, to rigid crates. Empty transport pockets with a pressed-together receiving compartment, i.e. pocket pouch can therefore be stored and conveyed in a space-saving manner. The receiving compartments do not need to be expanded to the extent that they take up space, until the goods are transported or stored.

Suspended conveying systems with transport pockets however have the disadvantage that it is difficult to reliably charge the transport pockets with goods in an automated process. Amongst other things, this is due to the fact that the pocket opening or receiving opening, through which the transport item must be inserted into the receiving compartment in a targeted manner, only has a limited size. As a rule, the transport pockets are moreover conveyed in a freely swinging or pivoting manner in suspended conveying systems, and this likewise renders the transfer of goods into the transfer pockets more difficult. I.e., additional measures are necessary for stabilising the transport pockets.

The published document DE 10 2008 061 685 A1 describes a loading station for transport pockets which are conveyed in a suspended conveying facility. The loading station includes an upper feed rail for the transport pockets, a perpendicular conveyor, which is subsequent to the feed rail, for feeding the transport pockets into a lower loading position, a device for opening the transport pockets in the loading position and a lower lead-away rail, which is subsequent to the perpendicular conveyor, for leading away the transport pockets out of the loading position.

Known loading stations have the disadvantage that these often have a complicated construction and a complex process course for the reasons mentioned above. The loading procedure is accordingly awkward. This results in the loading speed being unsatisfactory.

SUMMARY OF THE INVENTION

It is therefore an object of the present invention to suggest an appliance for charging transport pockets with a transport item, the appliance making do without additional devices as much as possible.

The appliance should further permit a reliable charging of the transport pockets, in particular also in the case of comparatively small receiving openings.

The appliance should moreover permit a charging of the transport pockets at a comparatively high speed.

In accordance with the invention, the design of the feed device and of the suspended conveying device and their arrangement relative to one another is such that the transport pockets are moved through the transfer zone in a lying formation and in a transfer conveying direction, and the transport item, by way of the feed device, is conveyed into the transfer zone essentially in the transfer conveying direction, in particular in the transfer conveying direction, of the transport pockets, and in a delivery region is delivered from above, in particular by way of gravity assistance, to the transport pockets which are moved through the transfer zone below the feed device in the transfer zone.

Essentially in the transfer conveying direction means that the two conveying directions enclose an angle to one another of less than 45° (angle degrees), in particular of less than 20°.

According to a further development, in the open position of the transport pocket, the pocket rear wall forms a rear wall section that is extended beyond the receiving compartment. In the transfer zone, the extended rear wall section in particular forms a support surface (rest surface) for the transferred transport item that is to be received into the receiving compartment of the transport pocket.

In particular, the receiving compartment forms a receiving opening for the transport item. In particular, in the open position of the transport pocket, the rear wall section is extended beyond the receiving opening.

In particular, the transport pocket includes a pouch wall that, together with the pocket rear wall, forms the receiving compartment for the transport item. In the transfer zone, the pouch wall in particular forms a support surface for the transport item that is to be received in the receiving compartment of a following transport pocket.

The transport pockets are each connected to the conveying member of the suspended conveying device in particular via a fastening means.

In the transfer zone, the suspended conveying device in particular forms a pocket support (pocket rest), on which the transport pockets lie in the transfer zone. In particular, the transport pockets lie on the pocket support in a manner such that the transport pockets and in particular their extended rear wall section or the pouch wall forms a support surface for the transport item that is to be received by the receiving compartment of the transport pocket.

The transfer zone defines that conveying zone in the appliance, in which the transport items are transferred, i.e. delivered or released, from the feed device to the suspended conveying device.

The pocket rear wall with the extended rear wall section includes a front side that faces the receiving opening or the receiving compartment and a rear side that lies opposite the front side and in particular faces the pocket support. In particular, the front side is arranged facing upwards and the rear side facing downwards with respect to the gravitational direction.

The receiving compartment is arranged at the front side of the pocket rear wall. Accordingly, the receiving compartment is delimited to the rear side by the pocket rear wall. The receiving compartment is delimited at the front side by the pouch wall that can be pressed together.

The pouch wall together with the pocket rear wall can form a receiving compartment, which is only open to the outside through the receiving opening. The pouch wall together with the pocket rear wall however can also form a receiving compartment, which is open to the side, as is shown for example in DE 10 2008 061 685 A1.

The extended rear wall section in particular extends at least over the complete width of the receiving compartment.

However, it is also possible for the transport pocket not to form an extended rear wall section. The receiving compartment can therefore also extend over the complete length of the pocket.

In particular, the term "lying" means that the transport pockets in the transfer zone are aligned horizontally or possibly inclined in the conveying direction, in a manner such that the transferred transport item can come to lie on the transport pocket, in particular on the extended rear wall section, outside the receiving compartment.

The lying arrangement of the transport pocket that is mentioned above in particular relates to the alignment or inclination of the pocket rear wall in the conveying direction, in particular of the extended rear wall section, of the transport pocket.

In the lying arrangement in the transfer zone, the transport pockets can also form an inclination angle with respect to the horizontal of smaller than 45°, in particular smaller than 20° (angle degrees) and very particular of smaller than 10°.

In particular, the inclination of the extended rear wall section is of a nature such that the extended rear wall section has a descent from its free end-section towards the receiving opening.

According to a particular embodiment variant, the transport pockets are aligned horizontally in the transfer zone.

In the transfer zone, the receiving compartment is trailing relative to the extended rear wall section considered in the conveying direction. Moreover, in the transfer zone, the receiving compartment is arranged above the pocket rear wall with respect to the gravitational direction. Moreover, in the transfer zone, the receiving opening is aligned in the conveying direction.

In the transfer zone, the transport pockets are arranged successively or one after the other, in particular in a gapless manner. The transport pockets thus form a support (rest) surface that is continuous in the conveying direction, for the transport item to be transferred.

The transport pockets can therefore be arranged end-to end, which is to say in an abutting manner in the transfer zone.

According to a particular further development, the transport pockets are arranged overlapping one another in the transfer zone. In this manner, the transport pockets in particular form an imbricate formation. Accordingly, the transport pockets are conveyed or moved through the transfer zone in an imbricate formation.

According to a particular formation of the imbricate formation, the transport pockets lie with a trailing rear wall part over a leading rear wall part of the extended rear wall section of the immediately following transport pocket.

In particular, in the transfer zone, the transport pockets are aligned in the conveying direction.

In this manner, a capture region is formed between the receiving openings of two transport pockets that are arranged successively in a gapless manner. The capture region then serves for capturing the transport item that is delivered by the feed device.

The capture region is delimited to the bottom, amongst other things in particular by the extended rear wall section. The extended rear wall section herein forms a mentioned support surface for the transport item.

In this manner, it is ensured that in the transfer zone, the transport item always comes to lie on a transport pocket and cannot fall through between two transport pockets.

The transport pockets are conveyed or moved through the transfer zone in a lying formation on carrying out the method. Hereby, the transport pockets in particular lie on a pocket support.

In the transfer zone, the transport item is delivered from the feed device to the transport pockets. As a characteristic feature of the present invention, the transport item now is not delivered into the receiving compartments of the transport pockets in a direct manner, but onto a support surface of the transport pocket that is formed by the transport pocket, in particular by the extended rear wall section of the transport pocket.

The transport pockets are moved further, in particular in the transfer conveying direction, during the transfer of the transport item.

In particular, the receiving compartment is in the open position during the transfer of the transport item, i.e. in the transfer zone.

For this, the feed device forms the mentioned delivery region in the transfer zone, at which region the transport item is delivered from the feed device.

The transport pockets are conveyed into the transfer zone below the delivery region in a manner such that the transport item can be delivered from the feed device onto the transport pockets from above, in particular by way of gravity assistance.

As a result, the transport item is fed to the transport pockets and delivered to these from above. Accordingly, after the transfer, the transport item lies on the transport pocket, in particular on the extended rear wall section or on the pouch wall of the transport pocket that runs ahead, which is to say which runs in front.

The transfer of the transport item can be effected by way of a guided movement. The transfer of the transport item can also be effected by way of a non-guided movement such as, e.g., a free fall.

The movement path, which is described by the transport item in the delivery region of the feed device, and the conveying path, which is described by the transport pockets in the transfer zone, in particular lie in a common plane.

A lying of the transferred transport item on the transport pocket, in particular on the front side of the extended rear wall section is only possible on account of an inclined or horizontally aligned rear wall section. It is obviously understood that a vertically aligned, extended rear wall section cannot form a support surface for the transport item during a suspended conveying of the transport pocket.

According to a further development of the appliance, the suspended conveying device includes a receiving zone indirectly or immediately subsequent to the transfer zone considered in the conveying direction, in which receiving zone the transport item is received by the receiving compartments of the transport pockets.

The transport pockets are conveyed further in the receiving zone such that the transport item slides into the respective transport pocket by way of gravity.

In particular, the receiving compartment is in the open position in the receiving zone.

In particular, the transport pockets are conveyed or moved in the receiving zone in an inclined manner in the conveying direction. For this, the suspended conveying device in the receiving zone in particular forms a pocket support, on which the transport pockets, which are conveyed in an inclined manner, lie.

The transport pockets can be brought into a hanging position in the receiving zone, in particularly subsequently to an inclined conveying.

In the receiving zone, the conveying path of the transport pockets in particular runs upwards with respect to the gravitational direction.

In the receiving zone, the inclination of the transport pockets in the conveying direction is selected such that a transport item, which is arranged on the transport pocket outside the receiving compartment, slides or slips into the receiving compartment, in particular counter to the conveying direction. The transport item herein slides in particular through the receiving opening into the receiving compartment.

The transport item thereby slides into the receiving compartment, in particular over an extended rear wall section. The inclination of the extended rear wall section is consequently of a nature such that the extended rear wall section has a descent from its free end section towards the receiving opening.

The inclination angle in the receiving zone can be 70° (angle degrees) or smaller, in particular 60° or smaller, with respect to the horizontal. The inclination angle in the receiving zone can moreover be 30° or larger, in particular 45° or larger.

In the receiving zone too, the receiving compartment is trailing relative to the extended rear wall section considered in the conveying direction. The receiving compartment is moreover arranged above the pocket rear wall with respect to the gravitational direction. The receiving opening is likewise aligned in the conveying direction.

In particular, the transport pockets are also arranged successively in a gapless manner in the receiving zone. The transport pockets can therefore be arranged subsequently to one another in an abutting manner in the receiving zone.

According to a particular embodiment of the further development, which is mentioned above, the transport pockets are arranged overlapping one another in the receiving zone. In this manner, the transport pockets in particular form an imbricate formation, which has already been described above. Accordingly, the transport pockets are conveyed or moved through the receiving zone in an imbricate formation.

In particular, in the receiving zone, the alignment of the transport pockets is parallel to the conveying direction. Accordingly, the transport pockets are pulled in the conveying direction.

In particular, the receiving zone is immediately subsequent to the transfer zone. In particular, the transfer zone can merge smoothly into the receiving zone, so that the inclination angle of the transport pockets increases directly after the delivery of the transport item.

Basically, it is also conceivable for the transfer zone and the receiving zone to form a common zone. In this case, the transport pockets are already aligned in an inclined manner in the transfer zone, so that the transport items can slide into the receiving compartment immediately after their delivery, on hitting the transport pocket.

In particular, in the transfer zone as well as in the receiving zone, the transport pockets lie with the rear side of their pocket rear wall on the pocket support.

The transport pockets can lie on the pocket support in an extensive manner such as, e.g., over the whole surface. The transport pockets can also lie on the pocket support in sections, such as over part of the surface or in a pointwise manner. A part-surfaced or point-like contact can be effected by way of suitable support means on the transport pocket such as support rollers or sliding elements.

In particular, the transport pocket lies with a trailing pocket section on the pocket support. Accordingly, the support means can be arranged in a trailing pocket section.

The pocket support can include separate guide elements for supporting the transport pockets. The guide elements can be stationary with respect to the transport pockets. In this case, the guide element serves for the rolling or sliding support of the transport pockets.

The guide elements, however, can also be co-moved with the transport pockets, e.g., via a circulating apparatus.

According to a particular embodiment, the pocket support is formed by conveying members of the respective following transport pockets. The transport pockets can lie on the conveying members in a direct or indirect manner.

In particular, the transport pockets are directly or indirectly supported via the fastening means of the conveying members. It is particularly fastening means that support the resting transport pockets over the whole width that are suitable for this.

In particular, this embodiment can be applied in connection with the formation of an imbricate formation of the transport pockets. It has the great advantage that no separate support elements need to be provided.

According to a further development, the extended rear wall section additionally has the function of a carrying section. The fastening means according to this further development in particular are arranged on the extended rear wall section, in particular on the free end section of the extended rear wall section. According to this further development, the fastening means is arranged in a leading manner with respect to the receiving compartment.

In particular, the fastening means includes a fastening element, via which the transport pocket can be fastened to the conveying member, in particular in a releasable manner.

The fastening element can be designed e.g. for hanging the transport pocket onto the conveying member.

The fastening element can thus, e.g., be an eyelet, via which the transport pocket is hung on the conveying member. The fastening element can also be a hook, via which the transport pocket is hung on the conveying member.

A further aspect of the invention moreover relates to a transport pocket for an appliance, which is described above. The transport pocket includes a receiving compartment with a receiving opening, a pocket rear wall and a fastening means for connecting the transport pocket to a conveying member of the suspended conveying device.

According to the invention, the transport pocket in its open position has a rear wall section, which is extended beyond the receiving opening, for forming a deposit surface for the transport item to be transferred into the transport pocket.

The length of the extended rear wall section in the open position of the transport pocket in particular is at least a quarter of the height or receiving depth of the receiving compartment. The length of the extended rear wall section can also correspond to at least a third or at least half the height or receiving depth of the receiving compartment. The height or receiving depth of the receiving compartment corresponds to the distance between the pocket base and the receiving opening.

The receiving compartment in particular is designed in a manner such that this can assume an open position and a space-saving compact position. In the open position, the receiving compartment is expanded and the receiving opening is open. The receiving compartment forms a receiving space for receiving a transport item. In the compact position, the receiving compartment is pressed together or compressed, e.g. folded together, in a space saving manner and accordingly does not form a receiving space.

For this, the pouch wall can be designed in a partly or completely flexible manner. In particular, the pouch wall can be foldable.

The walls of the transport pocket, in particular the pouch wall, can consist of a textile sheet formation such as fabric or contain this.

In particular, the pocket rear wall and in particular the extended rear wall section is designed in an intrinsically stable manner. I.e., the pocket rear wall in particular has a sufficient stiffness, in order, in the horizontal position, to be able to form a stable imbricate formation without a large-surfaced support from below.

The transport pocket can further include opening means, via which the receiving compartment can be moved into the open position or be held in this, in particular counter to the gravitational force.

The opening means can include restoring means on the transport pocket, the restoring means, by way of a restoring force that counteracts gravitational force, ensuring that the receiving compartment is opened and held in the open position without the action of a counter-force such as a pressing pressure, which counteracts the restoring force.

The restoring elements, for example, can be spring-elastic elements such as spring steel elements that act upon the walls of the receiving compartment. These elements for example can press the pouch wall away from the pocket rear wall.

The opening means can also include a holding-open element such as, e.g., a pivotable bow, on the transport pocket, the element bringing the transport pocket into an open position or holding it in this by way of the intrinsic weight.

The opening means can also include a holding-open element, such as, e.g., a pivotable bow, on the transport pocket, the element holding the transport pocket in an open position by way of a mechanical fixation, such as latching position or hooking position. The functions of the two holding-open elements, which are mentioned above, can also be combined.

It is moreover possible for the openings means on the transport pocket to interact with an activation means of the suspended conveying device, in order to bring the transport pocket into the open position or to hold it in this.

The opening means can thus include a cam element such as a cam roller, on the transport pocket, the element interacting with an activation means that is designed as a cam guide. In particular, the cam guide is stationary with respect to the transport pockets. The cam element can be arranged, e.g., on the pouch wall of the transport pocket. The cam guide effects a positional change of the cam roller and accordingly of the pouch wall relative to the pocket rear wall and this leads to an opening of the transport pocket.

The activation means can also include a magnet that exerts a magnetic force upon the magnetic opening means, such as metal bow and thus brings the transport pocket into an open position or holds it in this.

According to a further development of the transport pocket, this in the extended rear wall section includes at least one and in particular several through-openings. In particular, the through-openings are holes. The holes can form a hole pattern.

The at least one through-opening serves for optically examining whether the conveyed item is still arranged on the rear wall section or is located in the receiving compartment. The optical examination, which is effected subsequently to the receiving zone, can be effected by the eye or in an automated manner by way of optoelectronic sensor means that detect the light passage through the at least one through-opening.

Should an irregularity be ascertained with this optical examination, e.g., if the conveyed item is not completely stowed in the receiving compartment, then the respective transport pocket can be ejected (diverted) out of the conveying stream via an ejecting device.

Furthermore, a read device for reading out product data from a data carrier that is arranged on the transport item or on the transport pocket can be arranged subsequently to the receiving zone or to the optoelectronic sensor means, which are mentioned above.

As mentioned, the transport pocket can include support means (rest means), such as sliding elements or support rollers, for the sliding or rolling support of the transport pocket along a pocket support. The support means can be arranged, e.g., on the pocket rear wall, in particular on its rear side. The support means can be arranged laterally of the transport pocket considered in the conveying direction.

The suspended conveying device is designed for the suspended, in particular freely suspended conveying of the transport pockets. In particular, the suspended conveying device is designed for the individual, suspended conveying of transport pockets. I.e. the transport pockets are also conveyed in a suspended or freely suspended manner outside the transfer zone and receiving zone.

The term "individual" means that the transport pockets are not directly connected to one another, e.g., not interlinked.

In particular, the transport pockets are also led individually through the transfer zone and receiving zone.

The transfer pockets can therefore be conveyed further in an individually suspended manner subsequently to the receiving zone after the transport goods have slipped into the receiving compartments of the transport pockets.

The conveying members likewise include fastening means for fastening, in particular for releasably fastening the transport pockets to the conveying member. The fastening means can be fastening bodies. Considered in the conveying direction, these can include fastening arms that lead away laterally and via which the transport pockets are fastened to the conveying member.

The fastening means of the conveying members and transport pockets can be designed so as to permit a pivoting of the transport pocket relative to the conveying member.

The conveying members can be carriages, which are rollingly guided along at least one guide rail via runner rollers.

In particular, the carriages are designed as individual carriages. This permits the individual conveying of the transport pockets. The carriages can be designed as outer runners or inner runners.

The suspended conveying device, however, can also be a chain conveyor, concerning which the conveying members are fastened to a driven conveying chain.

The feed device can be designed to feed the transport item to the delivery region in a singularised or portioned manner. Hereby, the transport item is transferred to the individual transport pockets in each case in a singularised or portioned manner.

The feed device can be a belt conveyor. The transport item is accordingly fed to the delivery region on a conveying belt. The delivery region can be arranged at a deflecting location of the conveying belt, at which location the conveying belt is deflected downwards.

Delimitation elements such as transverse or separating strips (bars) can be arranged on the conveying surface of the conveying belt, said limitation elements subdividing the conveying belt into individual, open compartments which permit the singularised or portioned conveying of the transport item/items. The transport items which are conveyed to the delivery region in the compartments are envisaged for delivery to a transport pocket in each case. I.e. the transport item of a compartment is transferred to an individual transport pocket.

In particular, the feed device and the suspended conveying device are operated in a cyclically synchronous manner to one another in the transfer zone. Accordingly, the compartments of the conveying belt and the transport pockets are moved cyclically synchronously to one another into the transfer zone.

The transport item can be bulk goods such as powder, granulate, small parts (e.g. screws), etc. The transport item however in particular includes piece items (piece goods), i.e. individual discrete objects. These objects can be household articles, sport articles, clothes, shoes etc.

The appliance according to the invention is designed in particular to charge transport pockets with individual piece items. The piece items are fed individually from the feed device to the transfer zone. The piece items can therefore be fed individually to the delivery region in compartments of the belt conveyor described above.

The piece items, for example, can be singularised and fed to the feed device in a manual manner. The piece items can be individually filled into the compartments of the belt conveyor by the personnel.

A read device can be provided, the read device reading out information from data carriers of the piece items on transfer of the piece items to the feed device.

The read device can be, e.g., an optoelectronic read device that reads out a bar code or a 2D code, such as QR code.

The read device can also be designed for reading out RFID tags on the piece items.

The reading of the product information on transfer of the transport items to the feed device amongst other things serves for tracking the flow of the items.

The appliance according to the invention has the advantage that the transport item no longer needs to be conveyed through the receiving opening of the receiving compartment by the feed device with a high precision on delivery to the suspended conveying device.

The transport item is not received by the receiving compartments of the transport pockets until in a subsequent step after its delivery to the suspended conveying device.

The inventive delivery of the transport item from the feed device onto the suspended conveying device therefore permits greater tolerances, since the transport item does not need to be moved through the receiving opening in a precise manner on its delivery. Accordingly, the transport item can also be transferred in the transfer region at higher speeds, i.e. cycle rates.

BRIEF DESCRIPTION OF THE DRAWINGS

The subject-matter of the invention is hereinafter explained in more detail by way of embodiment examples which are represented in the accompanying figures. Shown schematically in each case are:

FIG. 6b a perspective view of the transport pocket according to FIG. 6a;

DETAILED DESCRIPTION OF THE INVENTION

Figure 1:
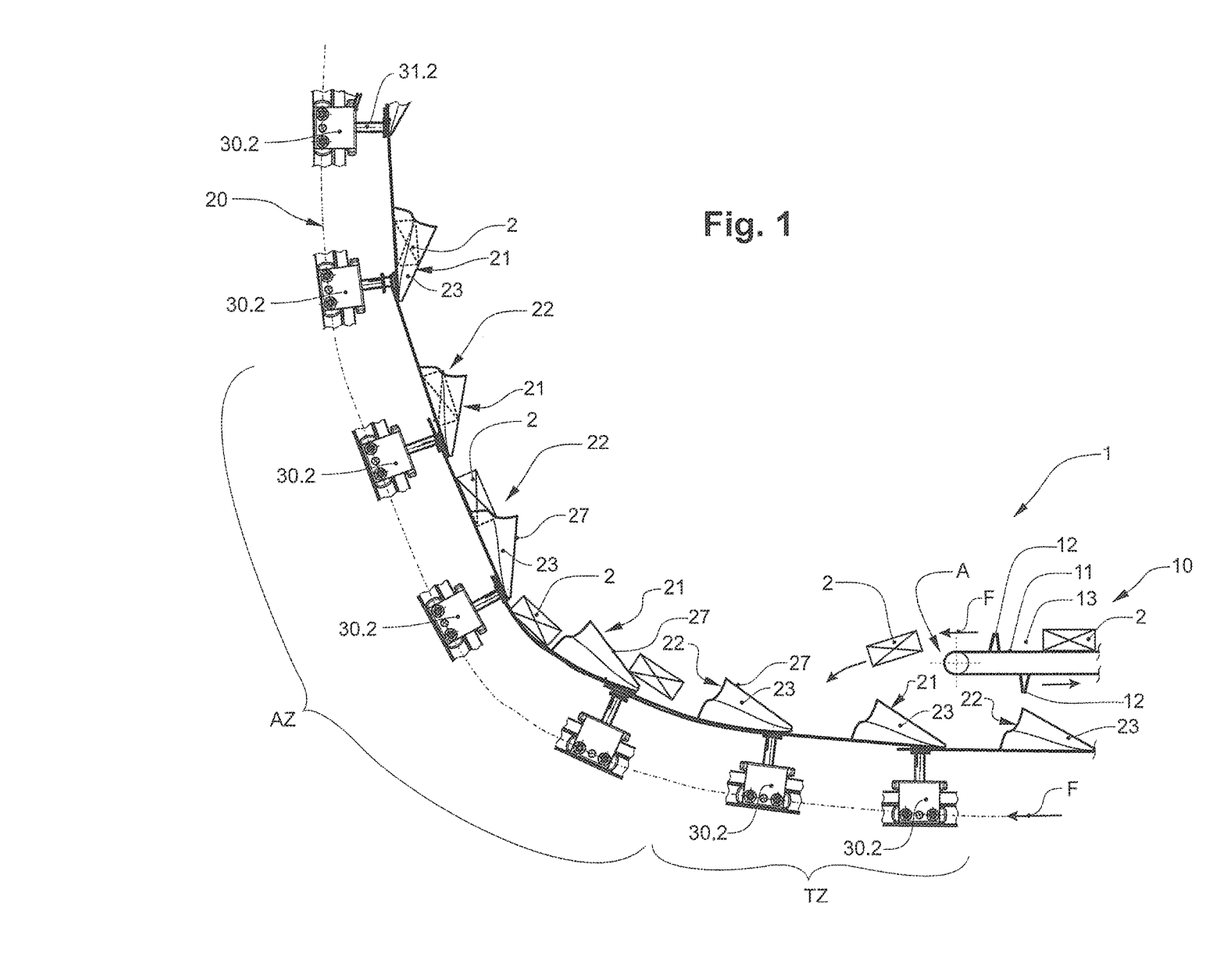
FIG. 1 a lateral view of a first embodiment of an appliance according to the invention, in the region of the transfer zone.
Figure 2:
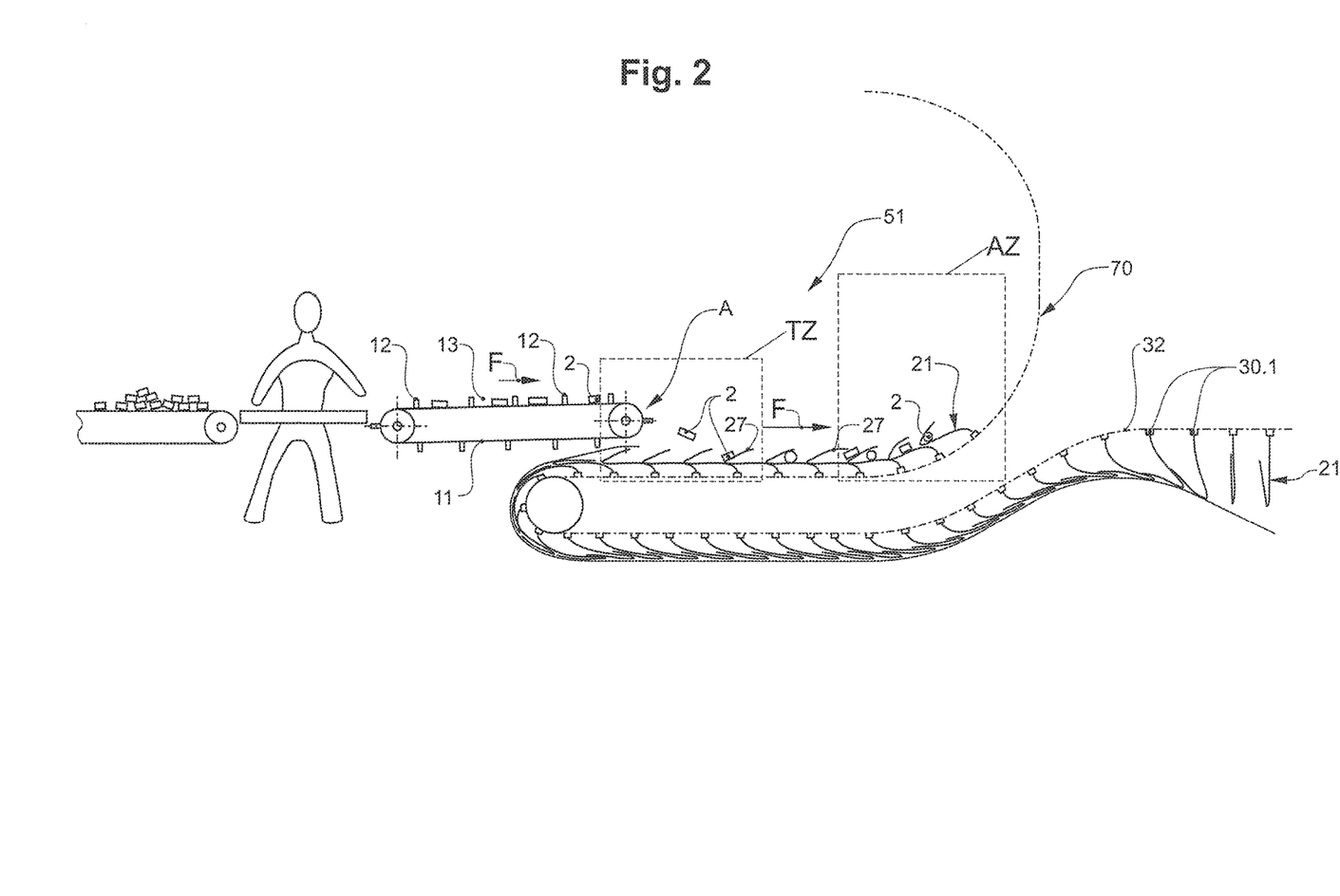
FIG. 2 a lateral view of a second embodiment of an appliance according to the invention, in the region of the transfer zone.

The appliances 1, 51 according to the two embodiments according to FIGS. 1 and 2 are designed for the transport or conveying of piece items 2. In the appliances 1, 51 according to both embodiments, the piece items 2 are fed to the transfer zone TZ by way of a belt conveyor 10. The conveying belt 11 of the belt conveyor 10 is designed as a compartmental belt and includes transverse strips 12, which, in the conveying direction F, subdivide the conveying belt 11 into individual compartments 13.

An individual piece item 2 is conveyed to the transfer zone TZ per compartment 13. The belt conveyor 10 forms a delivery region A at the entry to the transfer zone TZ, in which delivery region the piece items 2 are delivered from the compartments 13. In the delivery region A, the compartmental belt 11 is led into a deflection and deflected downwards. In this manner, the piece items in the transfer zone TZ drop downwards from the compartmental belt 11 on account of gravity.

The suspended conveying device 20, 70 includes a plurality of transport pockets 21, which are each fastened to a carriage 30.1, 30.2. The carriages 30.1, 30.2 are individually led along a guide rail 32 via rollers.

The transport pockets 21 each from a receiving compartment 23 for receiving the piece items 2. The receiving compartment 23 is delimited to the rear side by a pocket rear wall 24 and to the front side by a pouch wall 27. The receiving compartment 23 moreover forms a receiving opening 22.

Figure 3A:
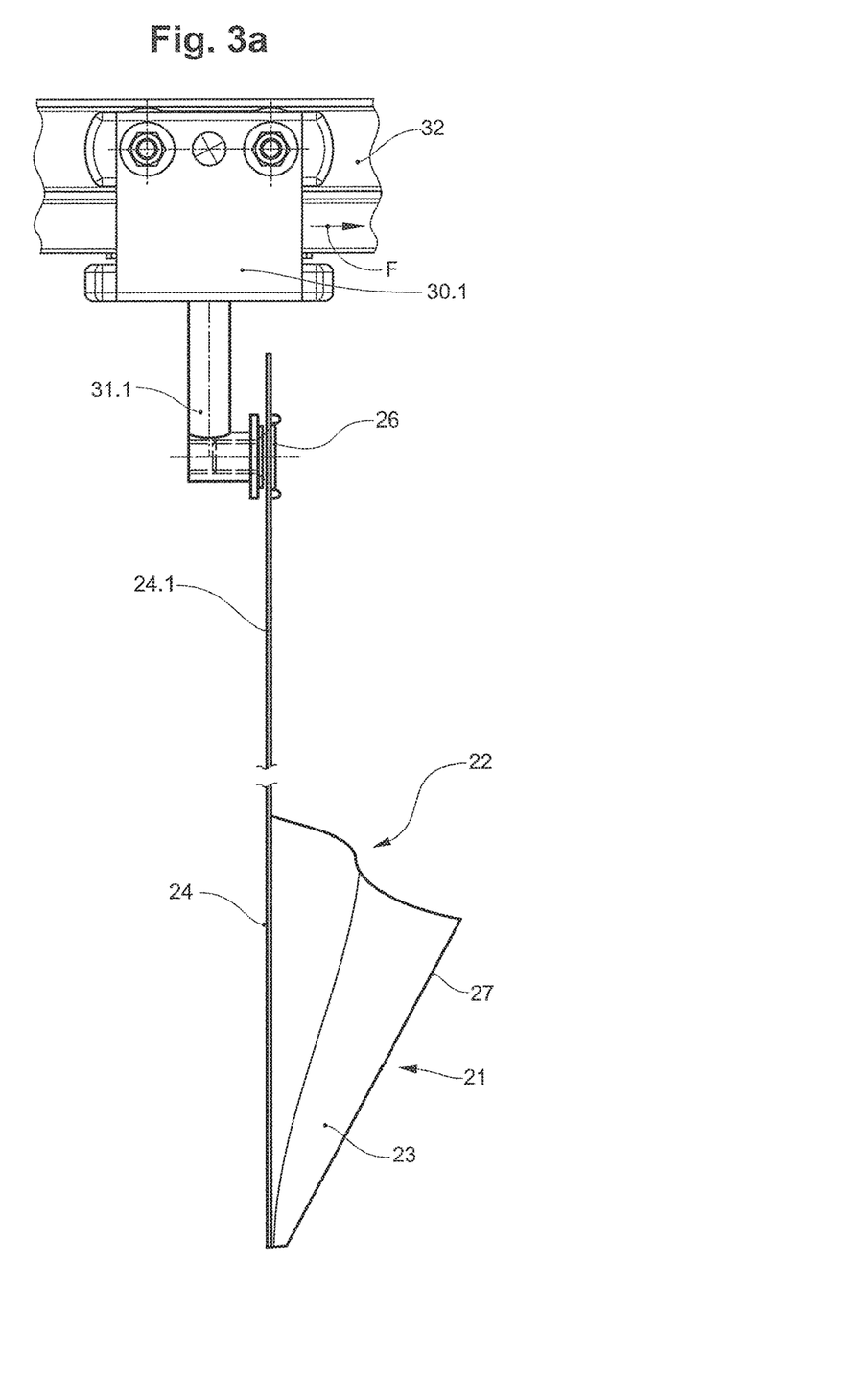
FIG. 3a a lateral view of a first embodiment of a transport pocket with a conveying member.
Figure 3B:
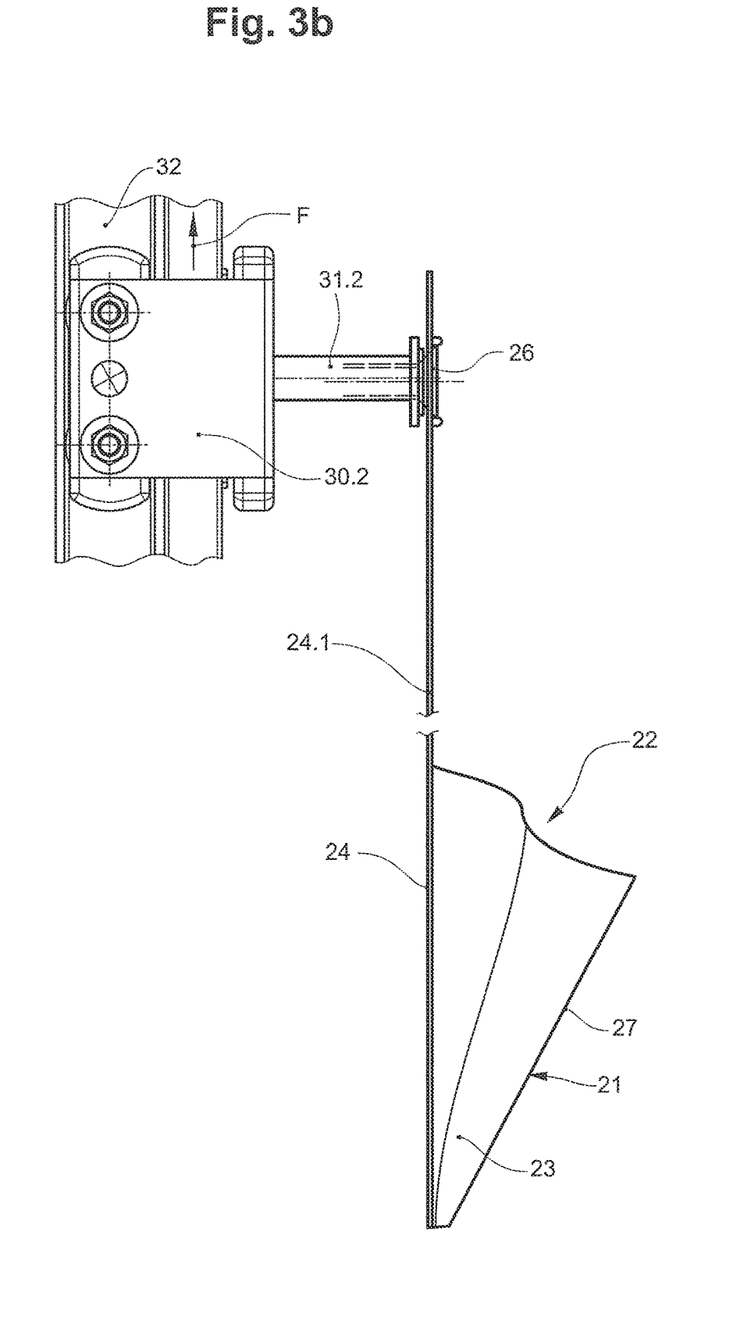
FIG. 3b a lateral view of the transport pocket according to FIG. 3a with a further embodiment of a conveying member.
Figure 4A:
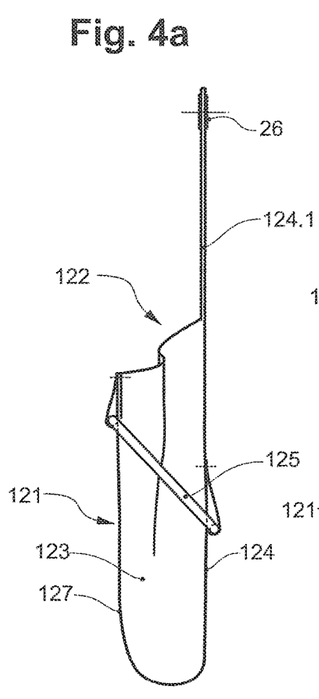
FIGS. 4a-4c a lateral view of a further embodiment of a transport pocket.
Figure 4B:
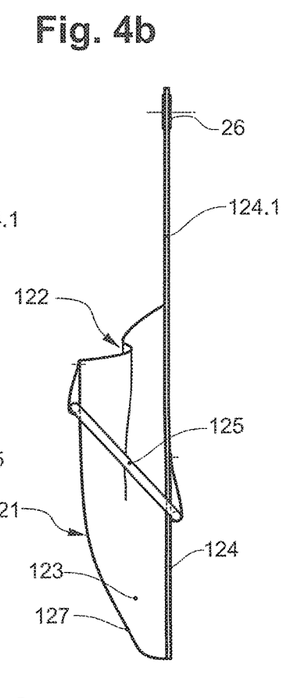
Figure 4C:
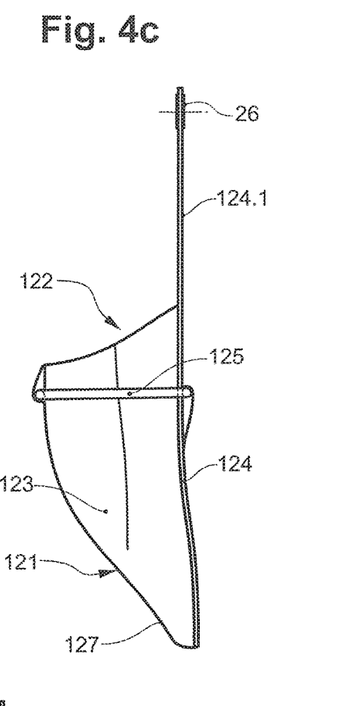
Figure 4D:
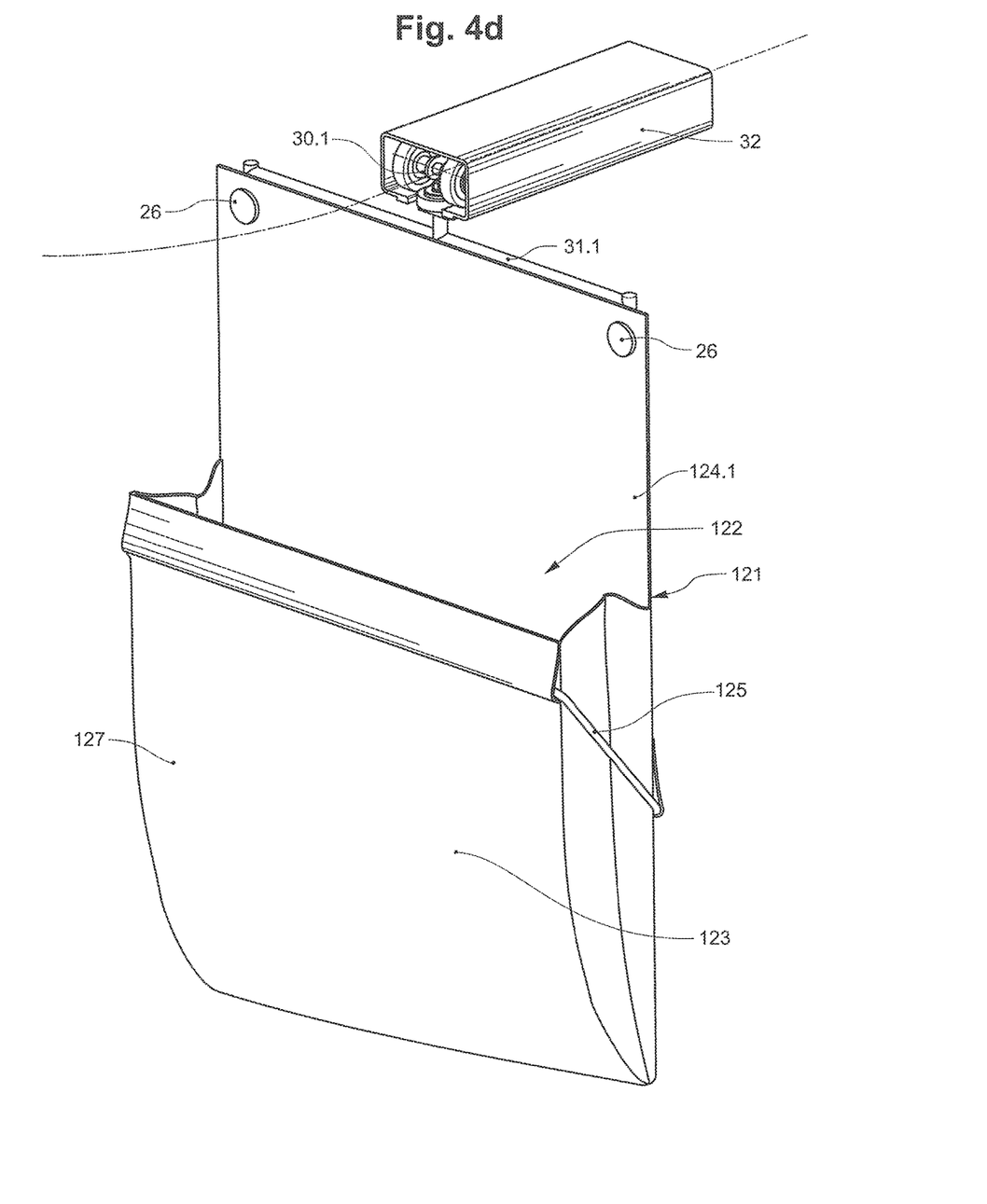
FIG. 4d a perspective view of the transport pocket according to FIG. 4a-4c.

The transport pockets 21 furthermore each form an extended rear wall section 24.1. Holding eyelets 26 for fastening the transport pockets 21 to the conveying member 30.2 are attached to the free end section of the extended rear wall section 24.1. The receiving compartment 23 is open to the side of the extended rear wall section 24.1 (see also FIGS. 3a and 3b).

The carriages 30.1, 30.2 each include a fastening body 31.1, 31.2 for fastening the transport pocket 21 to the carriage 30.1, 30.2.

According to the embodiment according to FIG. 1, the fastening of the transport pocket 21 is designed such that its pocket rear wall 24 is aligned in the conveying direction F.

The transport pockets 21 are now conveyed in imbricate formation and in the horizontal position below the delivery region A into the transfer zone TZ.

According to the embodiment according to FIG. 2, the fastening of the transport pocket 21 is designed such that its pocket rear wall 24 is aligned transversely to the conveying direction F. The transport pockets 21 are therefore bent at the extended rear wall section 24.1 into an alignment parallel to the conveying direction F, in particular in the transfer zone TZ, which is yet described hereinafter and in the receiving zone AZ.

According to this embodiment, the transport pockets 21 are fed from below along the deflection and in the horizontal position are conveyed into the transfer zone TZ below the delivery region A amid the formation of an imbricate formation.

According to both embodiments, a trailing rear wall part of the transport pocket 21 lies on a leading rear wall part of the extended rear wall section 24.1 of the immediately following transport pocket 21, in the imbricate formation.

A capture region is now formed between the receiving openings 22 of two adjacent transport pockets 21, wherein the extended rear wall section 24.1 forms a support surface for the piece item 2.

The piece items 2, which in the delivery region A are delivered from the feed device 10, on account of gravity now drop onto the transport pockets 21, which are conveyed with an imbricate formation past and below the delivery region A or fall into the capture regions, which are formed by the transport pockets 21 in imbricate formation.

The piece items 2 in particular fall onto the extended rear wall section 42.1 of the transport pockets 21. However, it is also possible for the piece goods 2 to drop partly or completely onto the pouch wall 27 of a respective transport pocket 21 that runs in front. In this context, it is however important for a piece item 2, which is to be transported into a certain transport pocket 21, not to fall onto the transport pocket 21 in front of the receiving opening 22 of the transport pocket 21, which runs in front considered in the conveying direction F. In such a case, the piece item 2 would indeed be transported into the transport pocket 21 that runs in front.

The feed device 10 and the suspended conveying device 20, 70 are operated cyclically synchronously to one another, so that the piece items 2 fall into the correct capture regions and are finally transported into the correct receiving compartments 23 of the transport pockets 21.

The compartments 13 of the conveying belt 11, for example, therefore have the same length in the conveying direction F as the capture regions of the imbricate formation of the transport pockets 21. The compartment length or length of the capture regions can, e.g., be 500 mm. The conveying belt 11 and the transport pockets 21 can be moved at the same conveying speed in the transfer zone TZ due to this.

The suspended conveying device 20, 70 forms a receiving zone AZ subsequently to the transfer zone TZ. The transport pockets 21 continue to be conveyed in an imbricate formation in the receiving zone AZ, wherein here too the extended rear wall section 24.1 forms a support surface for the piece item 2. The transport pocket 21, and in particular the extended rear wall section 24.1, however is inclined in the receiving zone AZ and forms a descent towards the receiving opening 23.

The piece item 2 in the receiving zone AZ now slides over the extended rear wall section 24.1 into the receiving compartment 23 of the associated transport pocket 21. If the piece item 2 lies on the pouch wall 27 of the running-ahead transport pocket 21, then this item firstly slips from the pouch wall 27 onto the extended rear wall section 24.1 of the subsequent transport pocket 21 and over this into the receiving compartment 23 of the trailing transport pocket 21.

In their horizontal or inclined position, which the transport pockets 21 assume in the transfer zone TZ and receiving zone AZ, these transport pockets are supported from below by a pocket support. The pocket support is formed by the conveying members 30.1, 30.2 themselves. I.e., the transport pockets 21 are each supported by the conveying members 30.1, 30.1 of the following transport pockets 21 or by their fastening bodies 31.1, 31.2. For this, the transport pockets 21 lie with a trailing pocket section on the conveying member 30.1, 30.2.

The transport pockets 21 with the piece items 2 in their receiving compartments 23 can be conveyed further in a suspended manner subsequently to the receiving zone AZ.

The transport pockets 121, 221, 321, 421, 521 according to the FIGS. 4a-4d, 5, 6a-6b, 7 and 8 each from a receiving compartment 123, 223, 323, 423, 523 for receiving the piece items 2. The receiving compartment 123, 223, 323, 423, 523 is delimited towards the rear side by a pocket rear wall 124, 224, 324, 424, 524 and towards the front side by a pouch wall 127, 227, 327, 427, 527. The receiving compartment 123, 223, 323, 423, 523 moreover forms a receiving opening 122, 222, 322, 422, 522.

The transport pocket 121, 221, 321, 421, 521 moreover forms an extended rear wall section 124.1, 224.1, 324.1, 424.1, 524.1. Holding eyelets 126, 226, 326, 426, 526 for fastening the transport pocket 121, 221, 321, 421, 521 to a conveying member 30.2 are attached to the free end section of the extended rear wall section 124.1, 224.1, 324.1, 424.1, 524.1. The receiving compartment 123, 223, 323, 423, 523 is open to the side of the extended rear wall section 124.1, 224.1, 324.1, 424.1, 524.1.

The transport pocket 121 according to the embodiment variant according to FIG. 4a-4d includes an opening bow 125 which on account of its intrinsic weight as well as a mechanical fixation keeps the transport pocket 121 open in the open position.

Figure 5:
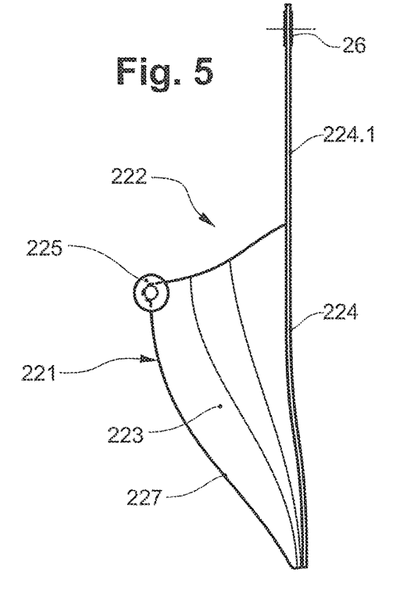
FIG. 5 a lateral view of a further embodiment of a transport pocket.

The transport pocket 221 according to the embodiment variant according to FIG. 5 includes a cam roller 225 on the pouch wall 227 in the region of the receiving opening 222, said cam roller interacting with a stationary cam guide in the suspended conveying device (not shown). The receiving compartment 223 is moved into an opened position or into a compact position depending on the position of the cam roller 225 along the cam guide.

Figure 6A:
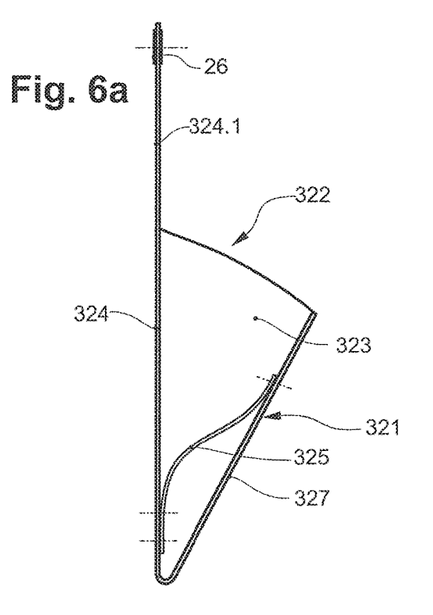
FIG. 6a a lateral view of a further embodiment of a transport pocket.
Figure 6B:
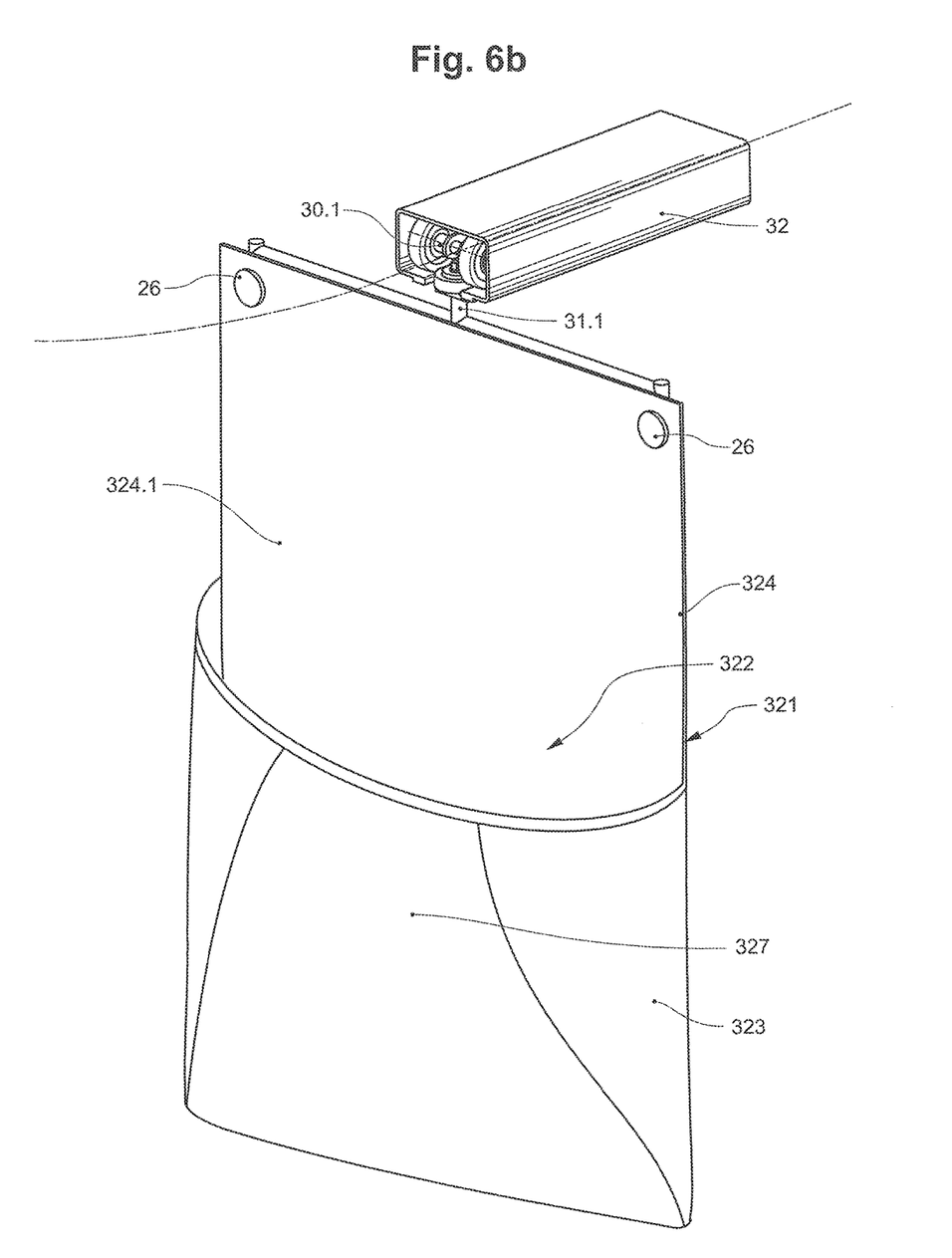

The transport pocket 321 according to the embodiment variant according to FIGS. 6a-6b includes a spring steel element 325 in the receiving compartment 323, the element pressing the pouch wall 327 into the opened position on account of its restoring force. The compact position is achieved by way of applying a counter-force, e.g., by way of a contact pressure.

Figure 7:
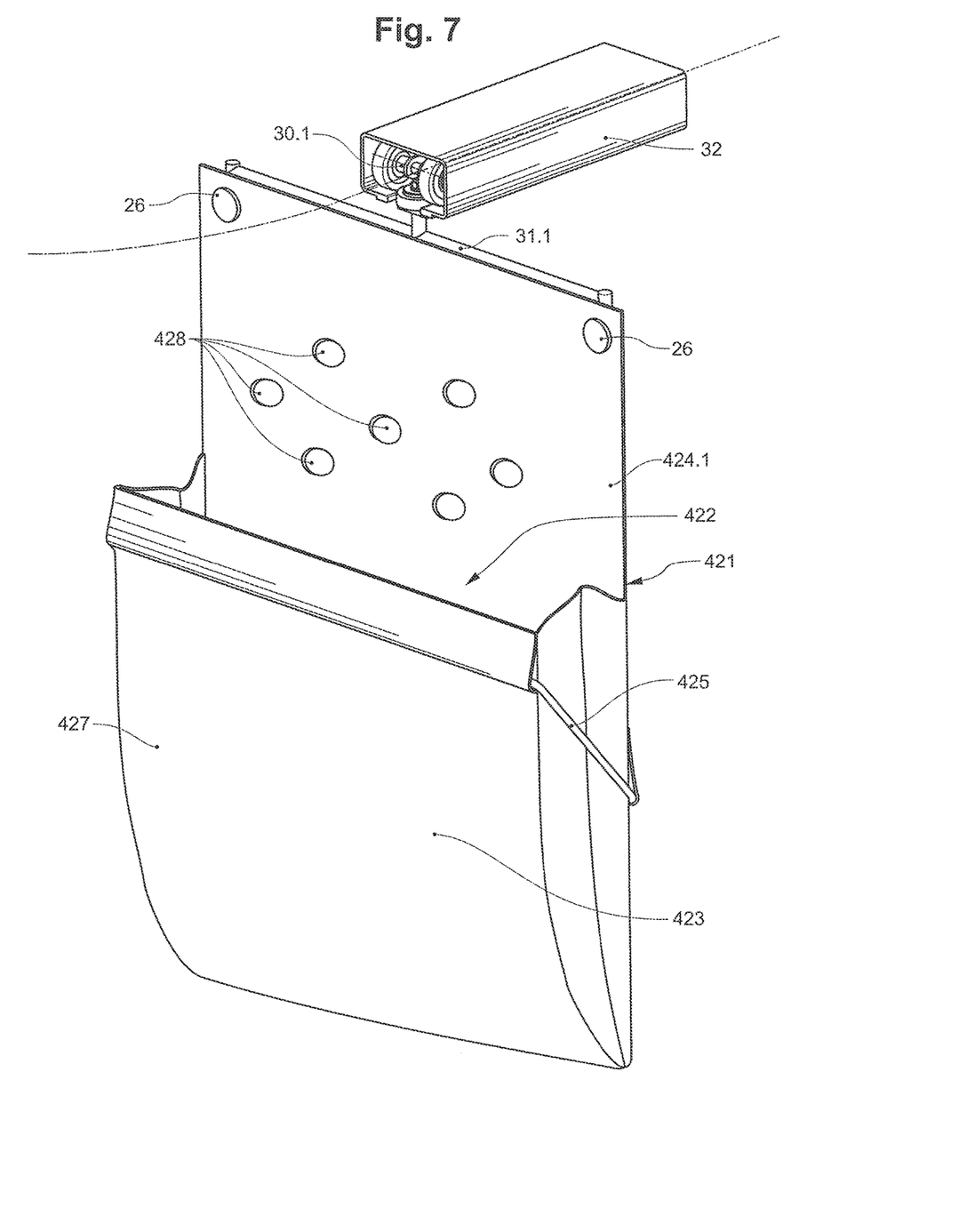
FIG. 7 a perspective view of a further embodiment of a transport pocket.

FIG. 7 shows a transport pocket 427 according to FIG. 4a-4d, however with the difference that the transport pocket 427 in the extended rear wall section 424.1 includes a hole pattern with a plurality of holes 428. These serve for examining whether the piece items 2 in the receiving zone AZ have actually slipped into the receiving compartments 423.

Figure 8:
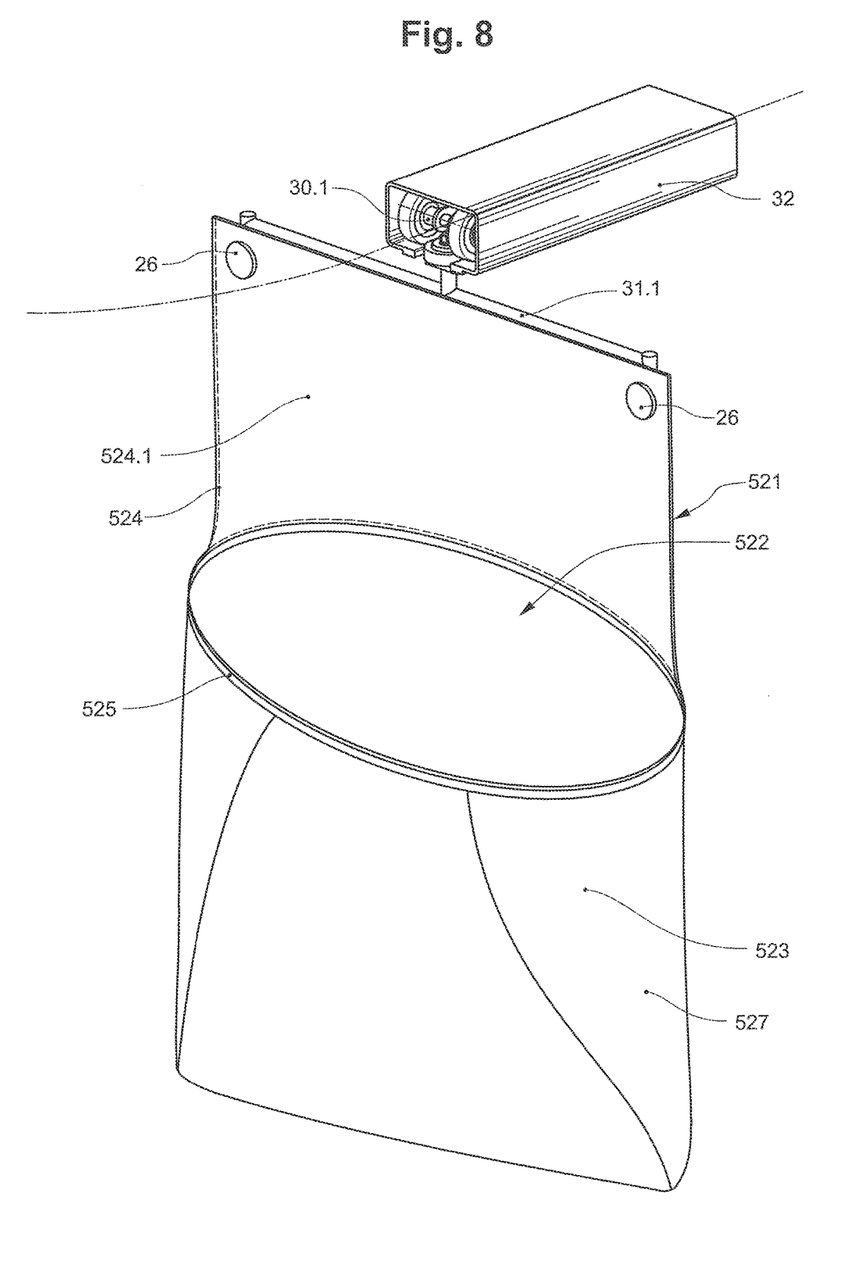
FIG. 8 a perspective view of a further embodiment of a transport pocket.

The transport pocket 521 according to the embodiment variant according to FIG. 8 includes a strip-like restoring element 525 which encompasses the receiving opening 522 and presses the receiving opening 522 into the open position or holds it in the open position on account of its restoring force. The restoring element 525 has spring-elastic characteristics. The restoring element 525 can be, e.g., a plastic strip or a spring steel strip.

The compact position is achieved by way of applying a counter-force, e.g., by way of a contact pressure.

The transport pockets, which are shown in the present figures, are merely exemplary. Other design variants of transport pockets, e.g., those without an extended rear wall section are likewise possible.

The invention claimed is:

1. An appliance for charging transport pockets with a transport item, comprising a feed device for feeding the transport item into a transfer zone, further comprising a suspended conveying device with a plurality carriages which are individually movable in a conveying direction along a guide rail for the individual conveying of transport pockets, wherein in each case a transport pocket is connected to one of the plurality of carriages, and the transport pockets are arranged one after the other in the conveying direction for taking over the transport item in the transfer zone and for conveying away the charged transport pockets, wherein the transport pockets each have a pocket rear wall and a pouch wall that, together with the pocket rear wall, forms a receiving compartment with a receiving opening, wherein the transport pocket is designed such that the receiving compartment can assume an expanded open position for receiving the transport item and a space-saving compact positions, wherein the design of the feed device and of the suspended conveying device and their arrangement relative to one another is such that the transport pockets are moved through the transfer zone in a transfer conveying direction in a lying formation with the receiving opening facing in the transfer conveying direction, and the transport item, by way of the feed device, is conveyed into the transfer zone essentially in the transfer conveying direction of the transport pockets, and in a delivery region is delivered from above onto the transport pockets which are moved through the transfer zone below the feed device.

2. The appliance according to claim 1, wherein, in the open position of the transport pocket, the pocket rear wall forms a rear wall section that is extended beyond the receiving compartment, and in the transfer zone, the extended rear wall section forms a support surface for the transport item on which the transport item may rest prior to said transport item being received into the receiving compartment of the transport pocket via the receiving opening.

3. The appliance according to claim 1, wherein in the transfer zone, the pouch wall of the receiving compartment forms a support surface for the transport item, which is to be received into the receiving compartment of a following transport pocket.

4. The appliance according to claim 1, wherein, in the transfer zone, the suspended conveying device forms a pocket support, on which the transport pockets lie.

5. The appliance according to claim 4, wherein the pocket support is formed by guide elements or by respectively following conveying members.

6. The appliance according to claim 1, wherein, in the transfer zone, the transport pockets are arranged successively in a gapless manner amid the formation of a continuous support surface for the transport item.

7. The appliance according to claim 1, wherein the transport pockets are arranged overlapping one another in the transfer zone.

8. The appliance according to claim 1, wherein the suspended conveying device forms a receiving zone subsequently to the transfer zone considered in the conveying direction, in which receiving zone the transport pockets are inclined, so that the transport item can slide over the extended rear wall section into the receiving compartment.

9. The appliance according to claim 8, wherein, in the receiving zone, the suspended conveying device forms a pocket support, on which the transport pockets lie.

10. The appliance according to claim 2, wherein the extended rear wall section acts as a carrying section, and a fastener for attaching the transport pocket to the conveying member is arranged on the extended rear wall section.

11. A method for charging transport pockets with a transport item by way of the appliance according to claim 1, wherein the transport item is fed to the transfer zone by way of the feed device and is transferred into the open receiving compartments of the transport pockets, said pockets being fed to the transfer zone by the suspended conveying device, comprising the steps of: moving the transport pockets through the transfer zone in the transfer conveying direction in a lying formation and conveying the transport item, by way of the feed device, into the transfer zone essentially in the transfer conveying direction of the transport pockets and delivering the transport items from above, in a delivery region, onto the transport pockets that are moved through the transfer zone below the feed device.

12. The method according to claim 11, wherein the transport pockets are moved one after the other through the transfer zone in a gapless manner and in the transfer zone form a continuous support surface for the transport item.

13. The method according to claim 11, wherein the transfer zone, the extended rear wall section and/or the pouch wall of the receiving compartment form a support surface for the transport item that is to be received into the receiving compartment of the transport pocket, and the transport item in the transfer zone is delivered from the feed device and is deposited on the extended rear wall section of the transport pocket and/or on the pouch wall of the receiving compartment of the transport pocket that runs in front.

14. The method according to claim 11, wherein the transport pockets are conveyed through the transfer zone in a manner lying on a pocket support.

15. The method according to claim 11, wherein the transport pockets, subsequently to the delivery of the transport item, in a receiving zone are conveyed further such that the transport item slides into the respective transport pocket on account of gravity.

16. The method according to claim 15, wherein the transport pockets are brought into a hanging position in the receiving zone, so that the transport item slides into the associated transport pocket due to gravitational force.

* * * * *